United States Patent
Beavers

(10) Patent No.: US 9,185,881 B1
(45) Date of Patent: Nov. 17, 2015

(54) CATTLE LEG LATCH

(71) Applicant: Brandon Beavers, Lebanon, KY (US)

(72) Inventor: Brandon Beavers, Lebanon, KY (US)

( * ) Notice: Subject to any disclaimer, the term of this patent is extended or adjusted under 35 U.S.C. 154(b) by 0 days.

(21) Appl. No.: 14/259,840

(22) Filed: Apr. 23, 2014

(51) Int. Cl.
*A01K 15/04* (2006.01)
*A61D 3/00* (2006.01)
*A01K 1/06* (2006.01)

(52) U.S. Cl.
CPC ............... *A01K 1/0613* (2013.01); *A61D 3/00* (2013.01); *A61D 2003/006* (2013.01)

(58) Field of Classification Search
CPC . A61D 3/00; A61D 2003/006; A01K 1/0613; A22B 1/00
USPC ......... 119/751, 752, 753, 755, 756, 724, 728, 119/732
See application file for complete search history.

(56) References Cited

U.S. PATENT DOCUMENTS

| | | | |
|---|---|---|---|
| 2,591,958 A | 4/1952 | McClees | |
| 2,672,126 A | 3/1954 | Linton | |
| 3,457,585 A * | 7/1969 | Edison | 452/53 |
| 3,693,595 A * | 9/1972 | Stewart | 119/728 |
| 4,055,148 A | 10/1977 | Brockman et al. | |
| 4,195,595 A * | 4/1980 | Shimonovich | 119/724 |
| 4,226,212 A | 10/1980 | Priefert | |
| 4,450,792 A | 5/1984 | Weiland | |
| 4,457,265 A | 7/1984 | Anderson | |
| 4,621,590 A | 11/1986 | Curwen | |
| 4,693,212 A * | 9/1987 | Black | 119/755 |
| 4,761,911 A | 8/1988 | Butera | |
| 4,934,321 A | 6/1990 | Madsen | |
| 5,014,648 A | 5/1991 | Konitizer | |
| 5,282,441 A * | 2/1994 | Ricketts | 119/724 |
| 8,079,174 B1 | 12/2011 | Turman et al. | |
| 8,561,576 B2 * | 10/2013 | Pingsterhaus | 119/732 |

* cited by examiner

*Primary Examiner* — Yvonne Abbott-Lewis
(74) *Attorney, Agent, or Firm* — Michael Coblenz

(57) ABSTRACT

A cattle leg latch that is mounted to a cattle restraining chute and that allows the cattle's leg to be safely secured to allow for inspection and hoof trimming. The leg latch consists of a based plate mounted to the bottom edge of the chute, with a handle pivotably mounted on the base plate and a latch hook pivotably mounted on the base plate, with the handle attached to the latch hook by means of a linkage that allows the latch hook to be moved when the handle is moved, and allows the latch hook to be closed around the animal's leg to secure the animal's legs while the animal is restrained in the chute.

9 Claims, 6 Drawing Sheets

CATTLE LEG LATCH

CROSS REFERENCE TO RELATED APPLICATIONS

Not Applicable.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a leg restraint for immobilizing the legs of a cow or other animal for the process of trimming the animals hooves or for inspecting the hooves and legs for medical reasons. The leg restraint is used in conjunction with a cattle immobilizing chute which immobilizes the cattle's body, while the leg latch immobilizes the legs and hooves.

2. Description of the Related Art

The hooves of ungulated animals grow continually. In some situations the animal walks enough so that the hooves are naturally worn down. But domesticated livestock typically do not walk or roam sufficiently, and in many cases their hooves need to be trimmed on occasion for the health and well being of the animal. The hooves of cattle are typically trimmed while the animal is immobilizing in a chute. In some cases the chute is raised and the hooves are trimmed when hanging below the animal. In other cases the animal is placed in a "layover" chute that flips the animal onto it side, with the hooves extending from the chute. It is often easiest to trim the hooves when the legs are restrained or stabilized. Hoof trimming chutes are well known. Some examples can be seen in U.S. Pat. No. 4,228,766 to Wedman, U.S. Pat. No. 5,669,332 to Riley, and U.S. Pat. No. 8,561,576 to Pingsterhaus. All three disclose variations of a chute for holding and immobilizing a cattle and laying over the cattle on to its side in order trim the hooves.

When the animal is in the layover chute the legs are extended outward and at about waist height, which makes them easy to access for medical inspection or hoof trimming. The legs need to restrained in order to hold the hooves still for trimming. Many hoof trimmers use a rope or chain to tie the hooves down. This can be a somewhat time consuming operation and often requires two hands to secure a rope or chain around the animal and then secure the rope or chain to a part of the chute. The rope or chain is also directly on the animal's leg, which can rub or bind the flesh and injure the animal. And once the hooves have been trimmed the rope or chain must be untied, which is both time consuming and can also potentially injure the animal. There is a need, therefore, for a device for quickly and easily securing an animals leg while the animal is in a chute, and that does not rub or scrape the animal's leg.

SUMMARY OF THE INVENTION

The invention consists of a latch that is attached to the bottom of an animal restraining chute and is used to secure the animal's legs. The latch has a handle and a latch hook, with the handle attached to the latch hook by means of a linkage arm that allows movement of the handle to move the latch, which allows the hook to be operated with one hand. This allows the user to hold one of the animal's legs in position below the latch hook, close the latch hook over the animal leg with the other hand by means of the handle, and lock the latch closed with the same hand. This process is repeated for each leg. This immobilizes the cattle's hooves for ease of inspection or trimming. When the operation is completed the latches can be easily unlocked with one hand to release the animal's leg.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
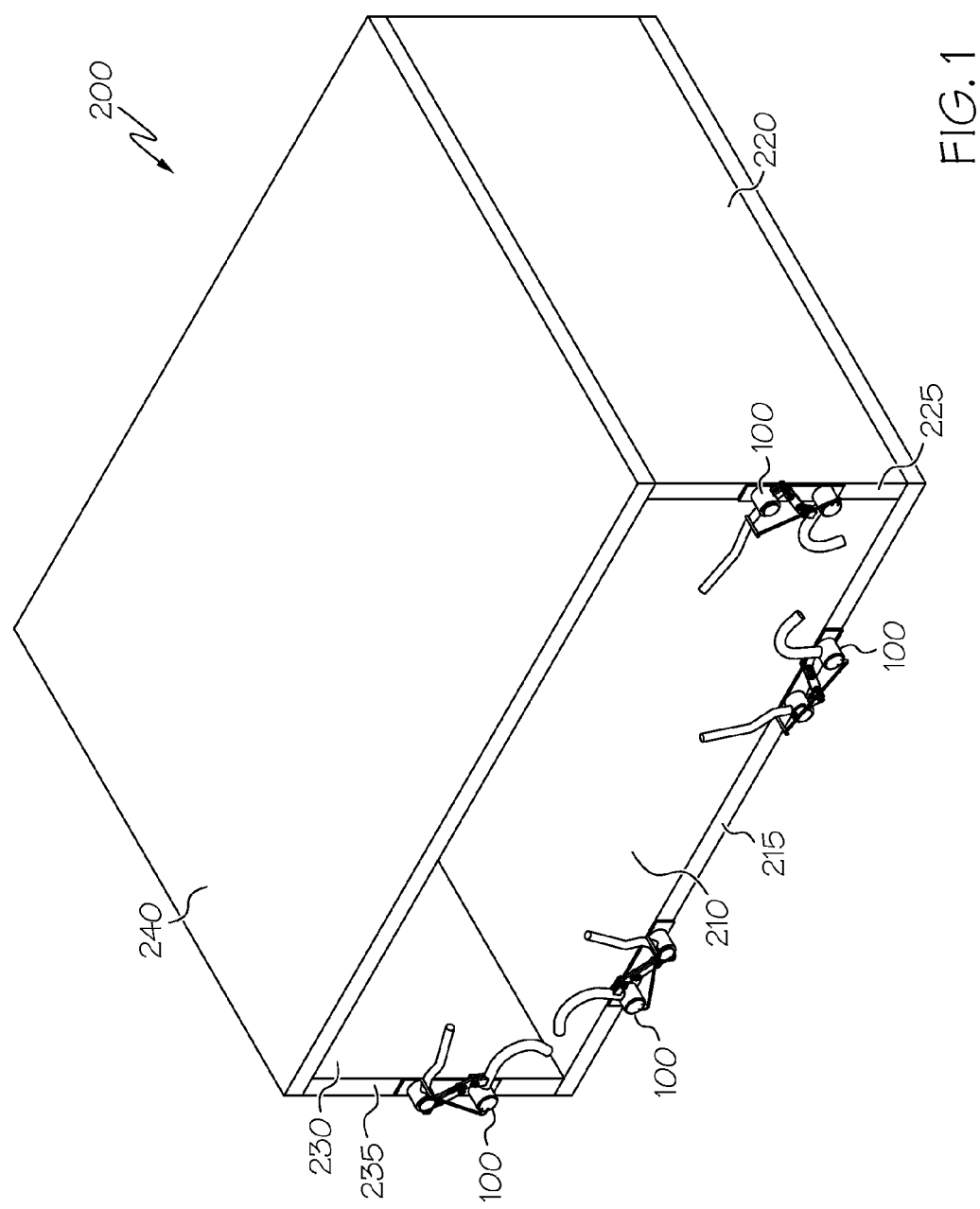
FIG. 1 is a perspective view of a representative layover type cattle restraining chute showing the position of the attached leg latches.

FIG. 1 shows a conventional cattle hoof trimming layover chute 200, with the leg latches 100 mounted on the bottom frame of the chute 200. In a layover chute 200 an animal such as a cow C is placed in the chute 200, and secured, and the chute 200 is rotated 90 degrees to lay on its side, placing the animal C on its side and leaving the animal's legs L and hooves H extending from the chute 200 for trimming. A chute 200 has an inside wall 210, a front wall 220 (typically a gate that opens and closes), a rear wall 230 (also a gate that can open and close), and an outside wall 240. The walls are typically made of metal, such as heavy duty steel or aluminum, that can withstand the forces and wear and tear of restraining and moving a large animal such as cattle C. Some walls are solid, others are made with bars, tubing or metal grating. The specific configuration of the walls are unimportant, and this latch 100 can be used with any existing cattle restraint chute.

The inside wall 210 has an inside wall bottom 215, the front wall 220 has a front wall bottom 225, and the rear wall 230 has a rear wall bottom 235. There are four leg latches 100 that are mounted onto the chute 200 to correspond to the four legs L of the animal C to be restrained. There is a leg latch 100 mounted on the front wall bottom 225 near where it intersects with the inside wall bottom 215. There is a leg latch 100 mounted on the rear wall bottom 235 near where it intersects with the inside wall bottom 215. There are two leg latches 100 mounted on the inside wall bottom 215, one near where it intersects with the front wall bottom 225 and one near where it intersects with the rear wall bottom 235.

Figure 2:
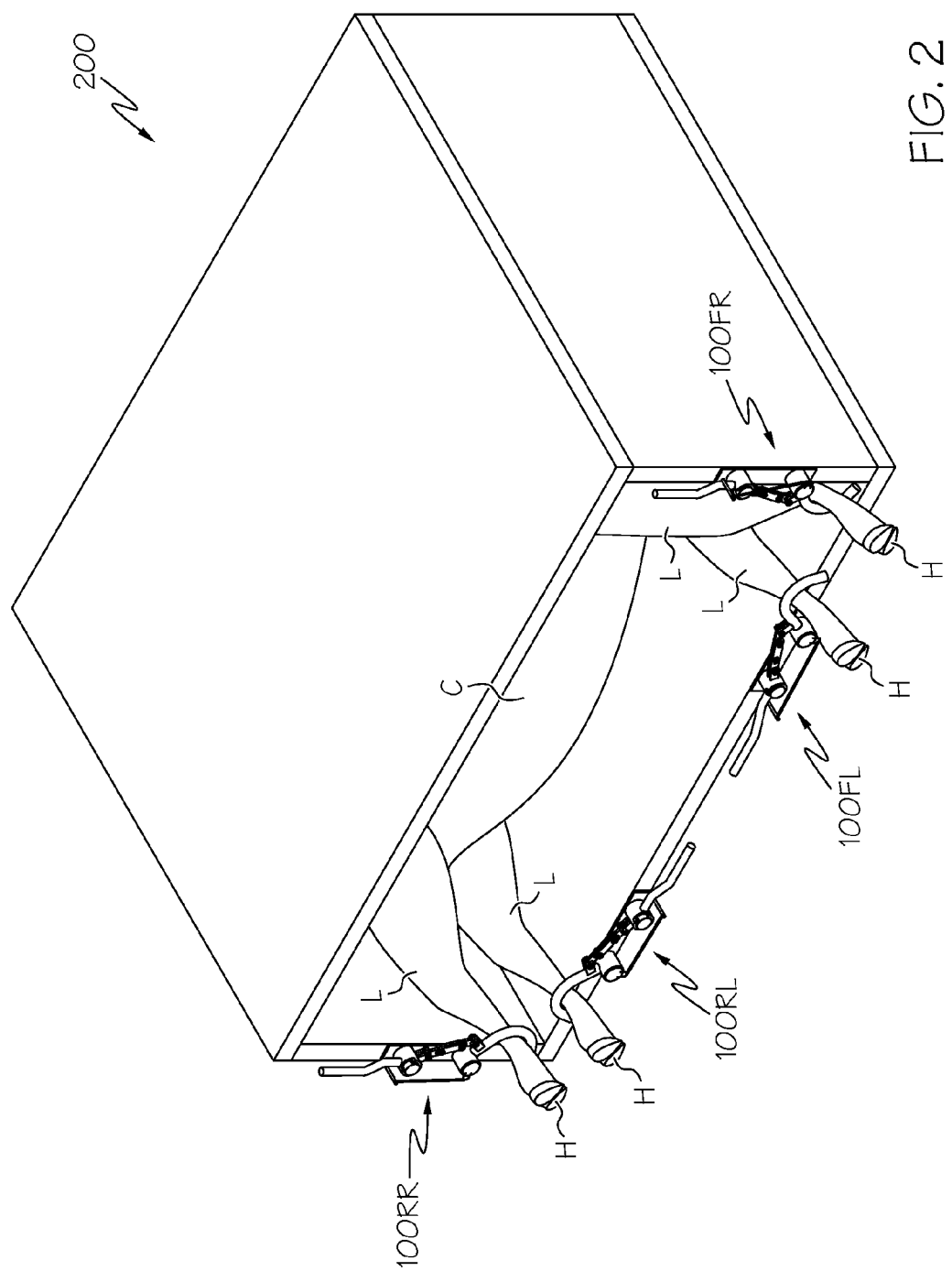
FIG. 2 is a perspective view of the chute of FIG. 1, with an animal inside the chute and with the animal's legs restrained by the leg latches.

FIG. 2 shows a cow C laying inside the chute 200. A cow C is shown because cattle are the most common type of animal restrained in such chutes 200, but the chute 200 and leg latches 100 can be used for any type of animal. FIG. 2 only depicts the lower portion of the cow C in relation to the chute 200 and does not depict any other component of the chute 200. When the animal C is in the chute 200, and when the chute 200 is laying on its side in the layover position, the cow C is laying on its left side with its legs L extending outward from the bottom of the chute 200. A cow's temperament is unpredictable. Some cows will lay absolutely still inside the chute and others will thrash. Often, when their legs are grabbed they have a tendency to pull away. It is important for trimming the hoof H that the leg L be secure. This prevents potential injury to both the cow C and the hoof trimmer. The location of the four leg latches allows for easily restraining the animal's legs L. When the leg L is secured in the leg latch 100, the hooves H are extended and secured and in the ideal position for trimming.

A cow C has four legs, and the four leg latches 100 correspond to the legs. The front right leg FRL is restrained by the front right leg latch 100FR. The front left leg FLL is restrained by the front left leg latch 100FL. The rear right leg RRL is restrained by the rear right leg latch 100 RR, and the rear left leg is restrained by the rear left leg latch 100 RL. The front right leg latch 100FR is located on the front wall bottom 225. The front left leg latch 100FL is located on the inside wall bottom 215 near where it adjoins the front wall bottom 225. The rear right leg latch 100RR is located on the rear wall bottom 235, and the rear left leg latch 100 RL is located on the inside wall bottom 215 near where it adjoins the rear wall bottom 235. The front right leg latch 100 FR and the rear left leg latch 100 RL are identical, and the front left leg latch 100 FL is identical to the rear right leg latch 100 RR. The two versions of the leg latches 100 are mirror images of each other.

As seen in FIG. 3, FIG. 4, FIG. 5, and FIG. 6, the leg latch 100 consists of a base plate 110 on which the other components of the leg latch 100 are mounted. In some configurations that base plate 110 has a number of mounting holes 111 which are used to mount the leg latch 100 to the chute 200. In some configurations the leg latch 100 is mounted to the chute by screws or preferably bolts that are run through the mounting holes 111. There are three mounting holes 111 shown in FIG. 3 and FIG. 4, but it is possible to mount the leg latch 100 with two or more bolts or screws. It is also possible, and within the conception of the invention, to weld the base plate 110 of the leg latch 100 to the chute 200. FIG. 2 depicts the leg latches 100 mounted to the underside of the chute, but it also possible, and within the conception of the invention to, to mount the leg latches 100 on the inside walls near the bottom of the chute 200.

The components of the leg latch 100 are attached to the base plate 110. In the preferred embodiment the base plate is ten and three quarters inches long, two inches wide, and made of a quarter inch steel plate. There is a handle post 112 mounted on one end of the base plate 110 and a latch post 115 mounted at the other end of the base plate 110. The handle post 112 and latch post 115 are cylindrical, and in the preferred embodiment are roughly one and one half inches in diameter. The center point of the latch post 115 and handle post 112 are approximately 6¾ inches apart, but these dimensions can vary. Because of the forces involved in restraining the legs of a large animal, the posts must be relatively large and made of a strong material such as steel tubing. In the preferred embodiment the handle posts 112 and latch post 115 are made of one and one half (1½") inch diameter steel tubing. It is possible for the exact size of the posts to vary slightly, from one to two inches in diameter. In the preferred embodiment the handle post 112 and latch post 115 are welded to the base plate 110, but they can conceivably be bolted on or attached in any conventional and secure manner.

There is a handle sleeve 121 disposed around the handle post 112. The handle sleeve 121 is a tubular cylinder and has an inner diameter that is slightly larger than the outer diameter of the handle post 112 such that the handle sleeve 121 can rotate around the handle post 112. In the preferred embodiment the handle sleeve 121 is made from two inch (2") diameter steel tubing that is one quarter inches (¼") thick, which gives it an inner diameter of one and one half inches (1½"), which provides a snug fit over the handle post 112. There is detent 122 in the handle sleeve 121, and a handle stop 113 mounted on the handle post 112. In the preferred embodiment the detent 122 is a cut-out of approximately one quarter of the circumference of the top of the handle sleeve 112, cut approximately one half inches from the top. These dimensions can vary slightly in alternate embodiments. The handle stop 113 is a small cylindrical post having an approximate height of one quarter inch and an approximate diameter of one half and inch. There is a handle 120 having a distal end 124 and a proximal end 125, with the handle proximal end 125 attached to the handle sleeve 121. In the preferred embodiment the handle is made from a three quarter inch bar, or three quarter inch steel tubing, but in alternate embodiments these dimensions can vary. In the preferred embodiment the handle 120 has a slight bend, but the exact configuration of the handle 120 can vary. The handle 120 is approximate twelve inches in length, but its overall length can vary, thought it cannot be too short as this will decrease the leverage for moving the handle 120. In the preferred embodiment the handle 120 is welded to the handle sleeve 121, but it is possible to attach the handle 120 to the handle sleeve 121 in any suitable conventional manner.

There is a handle spring mount 123 attached to the handle 120 near the proximal end 125. The handle spring mount 123 is a post of approximately one quarter inch diameter and two inches in length extending at a ninety degree angle from the handle 120. As noted, all of the components are made of steel, though it is possible to make the components of any suitably strong and durable material. To construct the handle 120 components, the handle 120 is first welded to the handle sleeve 121 and the handle spring mount 123 is welded to the handle 120. Next the handle stop 113 is mounted onto the handle post 112, either by welding or other conventional and suitable means, and the handle sleeve 121 is slide over the handle post 112. The handle post is then mounted to the base plate 110. The handle sleeve 121 will rotate around the handle post 112, and the handle stop 113 will sit within the detent 122, which will limit the distance that the handle 120 will rotate around the handle post 112. It is possible, though not necessary, to use grease, oil, or other suitable lubricant to smooth the rotation of the handle sleeve around the handle post.

There is a latch sleeve 151 disposed around the latch post 115. The latch sleeve 151 is a tubular cylinder and has an inner diameter that is slightly larger than the outer diameter of the latch post 115 such that the latch sleeve 151 can rotate around the latch post 115. It is possible, though not necessary, to aid the rotation of the latch sleeve 151 around the latch post 115 with grease, oil or other lubricants. In the preferred embodiment the latch post 115 is made from one and one half inch diameter steel tubing, but in alternate embodiments these dimensions can vary. There is a latch post cap 117 attached to the end of the latch post 115 to prevent the latch sleeve 151 from sliding off the latch post 115. The latch post cap 117 is a circular plate with a diameter slightly larger than the inner diameter of the latch sleeve 151 such that it prevents the latch sleeve 151 from sliding off the latch post 115. The latch hook 150 itself is a semi-circular curved piece of metal that forms a hook that can latch around an animal's leg L. In the preferred embodiment the latch hook 150 is made from a length of one inch steel rod or tubing, but the dimensions can vary slightly. The latch hook 150 is made from a smooth material to prevent the possible injury of the animal's leg L while restrained. The latch hook 150 has a hook end 152 and a mount end 153 that is attached to the latch sleeve 151. The latch hook 150 can be attached to the latch sleeve 151 in any convention and sturdy manner, but in the preferred embodiment the mount end 153 of the latch 150 is welded to the latch sleeve 151.

There is a linking mechanism or linkage, referred to herein as an arm 180, that is attached between the handle 120 and the latch 150 and that allows the handle 120 to rotate the latch 150. There is a handle mounting bracket 130 that is attached to the handle sleeve 121. In the preferred embodiment the handle mounting bracket 130 consists of two rectangular plates that protrude from the handle sleeve 121 at a ninety degree angle. The two plates are approximately one and one half inches long, one inch wide, and one quarter inch thick. There is an elbow hole 131 in the end of the handle mounting bracket 130, which is sized to accommodate a standard bolt. In the preferred embodiment the elbow hole 131 is one half inches in diameter. There is a latch handle mounting bracket 140 that is attached to the latch sleeve 151. In the preferred embodiment the latch mounting bracket 140 consists of two rectangular plates that protrude from the mount end 153 of the latch 150 at a ninety degree angle. The two plates are approximately one and one half inches long, one inch wide, and one quarter inch thick. There is a wrist hole 141 in the end of the latch mounting bracket 140, which is sized to accommodate a standard bolt, and in the preferred embodiment is one half inches in diameter.

The arm 180 is a length of rigid material that allows the rotation of the handle 120 to rotate the latch 150. In one embodiment that arm 180 is a flat piece of metal with an elbow end 183 and a wrist end 184. In one embodiment the arm 180 is a single piece of metal one inch wide, one quarter inch thick and six inches long. There is a hole 185 in the elbow end 183 and a hole 186 is the wrist end 184. These holes 185 and 186 are approximately one half inches in diameter, and sized to accommodate a standard bolt. The elbow end 183 hole 185 is aligned with the elbow hole 131 of the handle mounting bracket 130, and rotatably attached by means of a bolt that runs through both holes. These and other rotatable components can also be attached by a pin or other common rotatable attachment. In the drawings the bolts obscure the holes making it appear that the bolts are numbered, but it is the holes that are numbered. The wrist end 184 hole 186 is aligned with the wrist hole 141 of the latch mounting bracket 140, and rotatably attached by means of a bolt that runs through both holes.

Figure 4:
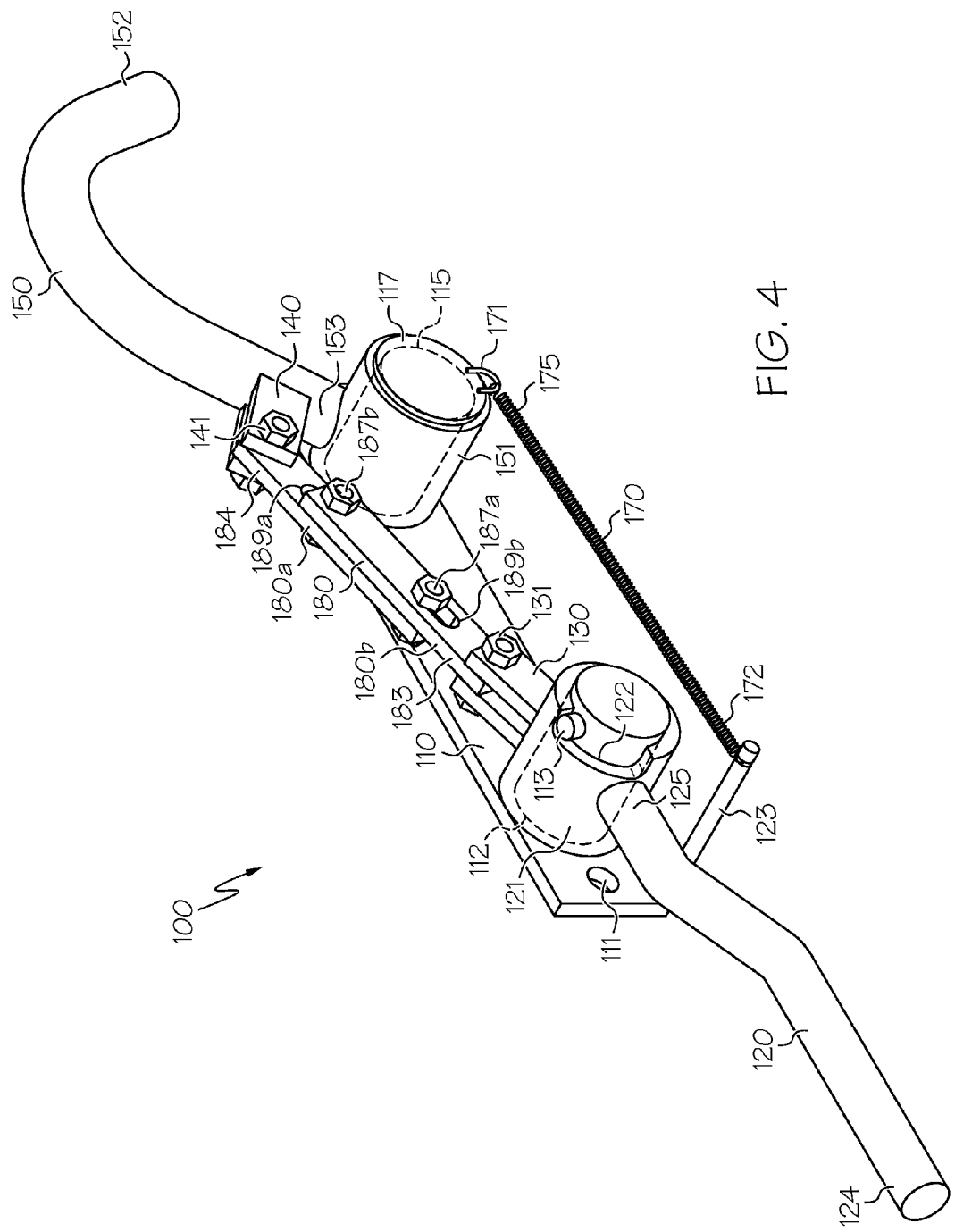
FIG. 4 is a perspective view of the leg latch in the closed position.

In the preferred embodiment the arm 180 is made up of two sliding plates 180a and 180b, both having an attachment hole 187a & 187b on one end and an adjustment slot 189a & 189b on the other, and secured together with two bolts. This is best seen in FIG. 4. Each plate 180a and 180b is approximately four and one half inches long, with the two slots 189a & 189b running at either end. This allows the length of the arm 180 to be adjusted if necessary. The proper length is important to achieve straight line between the arm 180 and the handle mounting bracket 130 which allows the latch hook 150 to be locked into place, as described below.

In operation that handle 120 is rotated toward the latch hook 150 to open the latch hook 150. The detent 122 will hit the handle stop 113 and prevent further movement of the handle 120. When the handle 120 is rotated toward the latch hook 150 the handle mounting bracket 130 will rotate downward or away from the latch hook 150, which will pull the elbow end 183 of the arm 180 away from the latch hook 150, which will in turn pull the latch mounting bracket 140 and pull the hook end 152 upward, thus opening the latch hook 150. To close the hook end 152 of the latch hook 150 around an animal's leg L the handle 120 is rotated away from the latch hook 150. When the handle 120 is rotated away from the latch hook 150 the handle mounting bracket 130 will rotate upward or toward the latch hook 150, which will force the elbow end 183 of the arm 180 toward the latch hook 150, which will force the arm 180 to push the latch mounting bracket 140, which will rotate the latch 150 downward and around the leg L. When the handle 120 is fully downward and the detent 122 engages the handle stop 113 the arm 180 and the handle mounting bracket 130 will be in a straight line, effectively locking the latch hook 150 into position. When the arm 180 and handle mounting bracket 130 are in a straight line they cannot be moved by movement of the latch hook 150, which essentially locks the latch hook 150 in place. This will prevent the leg latch 100 from opening due to the movement of the animal's leg L. The two sliding plates 180a & 180b of the arm 180 allow the length of the arm 180 to be adjusted so that it is the proper length to create the straight line with the handle mounting bracket 130 when the latch hook 150 is in the fully closed position.

Figure 3:
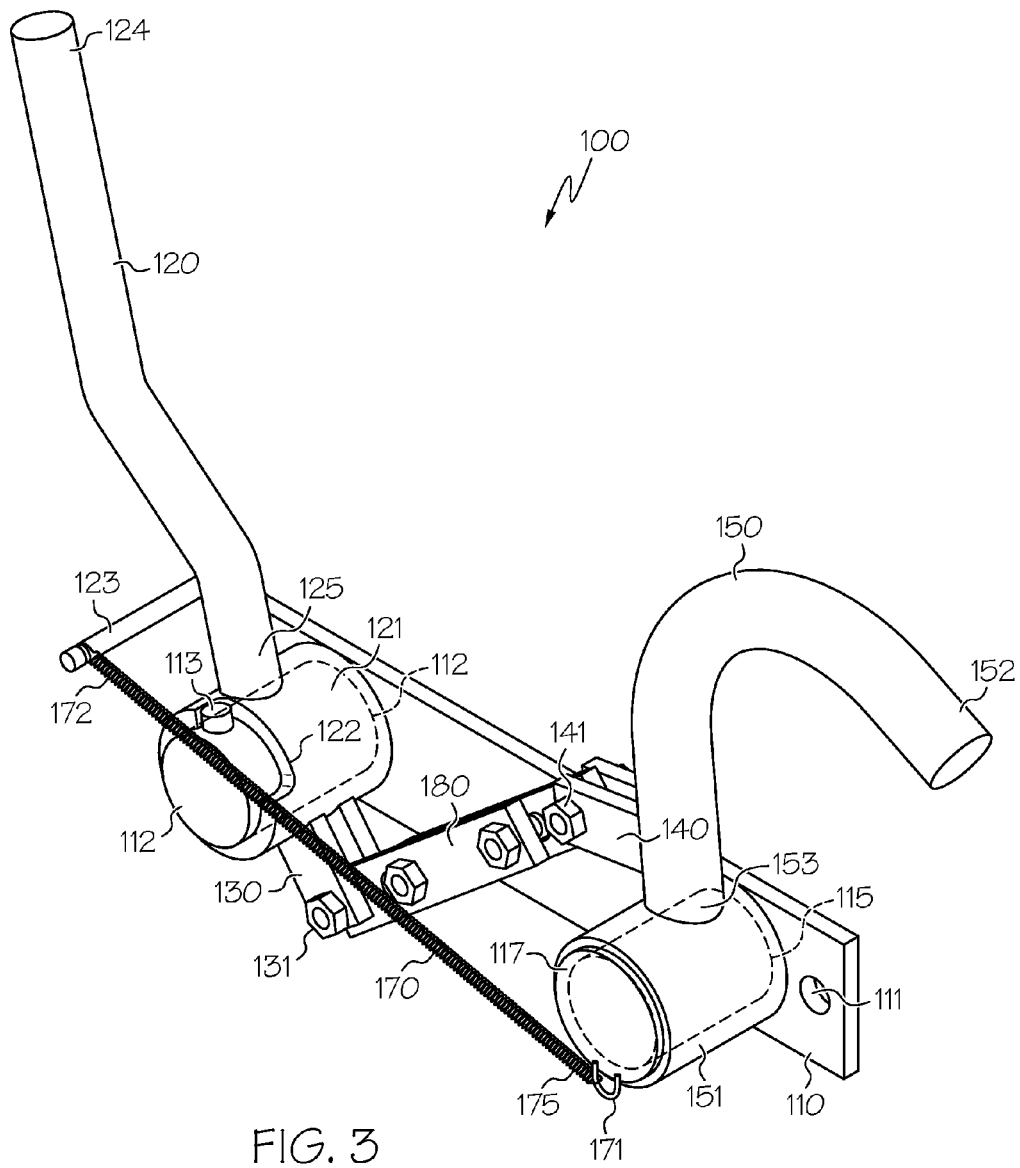
FIG. 3 is a perspective view of the leg latch in the open position.
Figure 5:
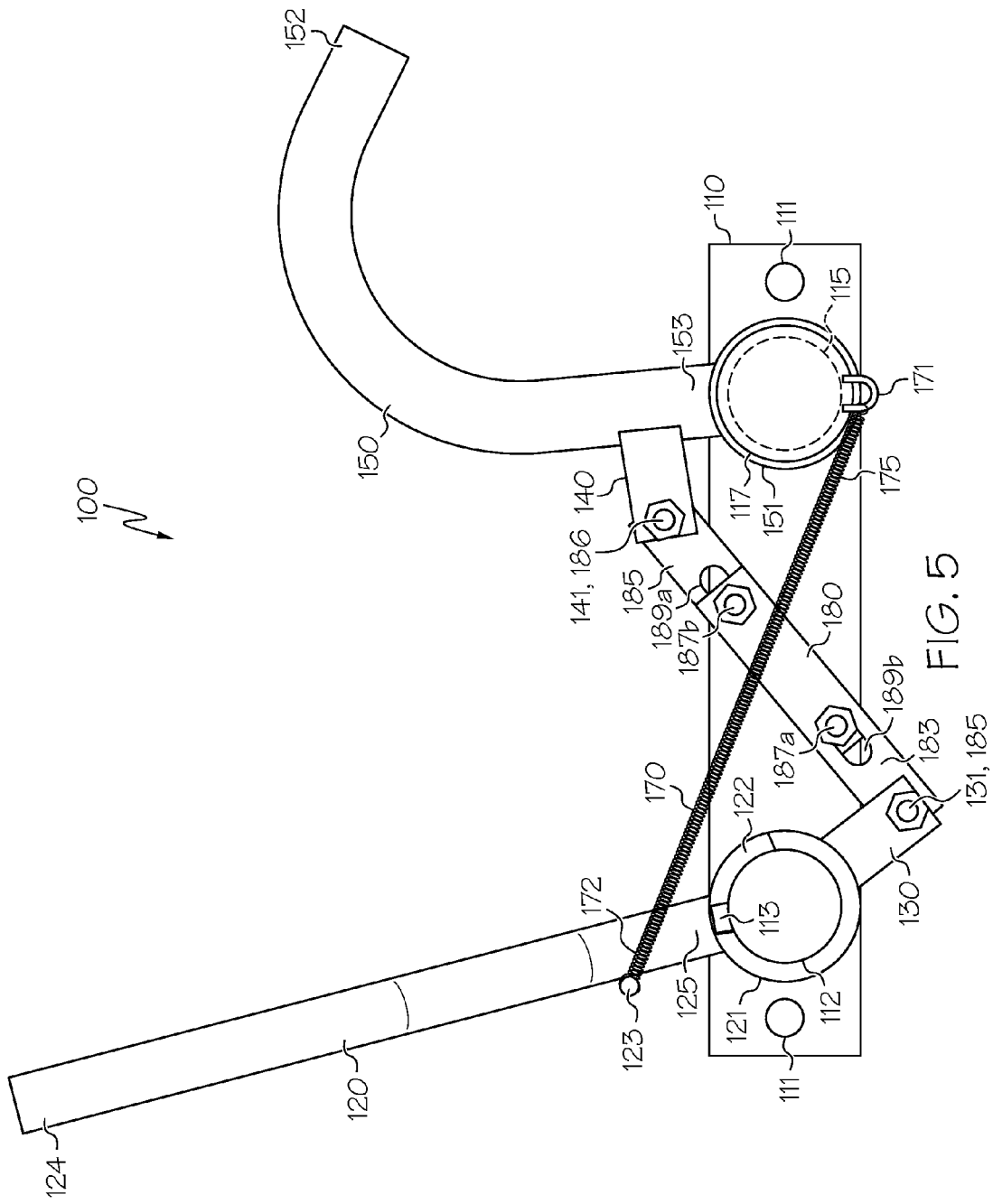
FIG. 5 is a side elevation view of the leg latch in the open position.
Figure 6:
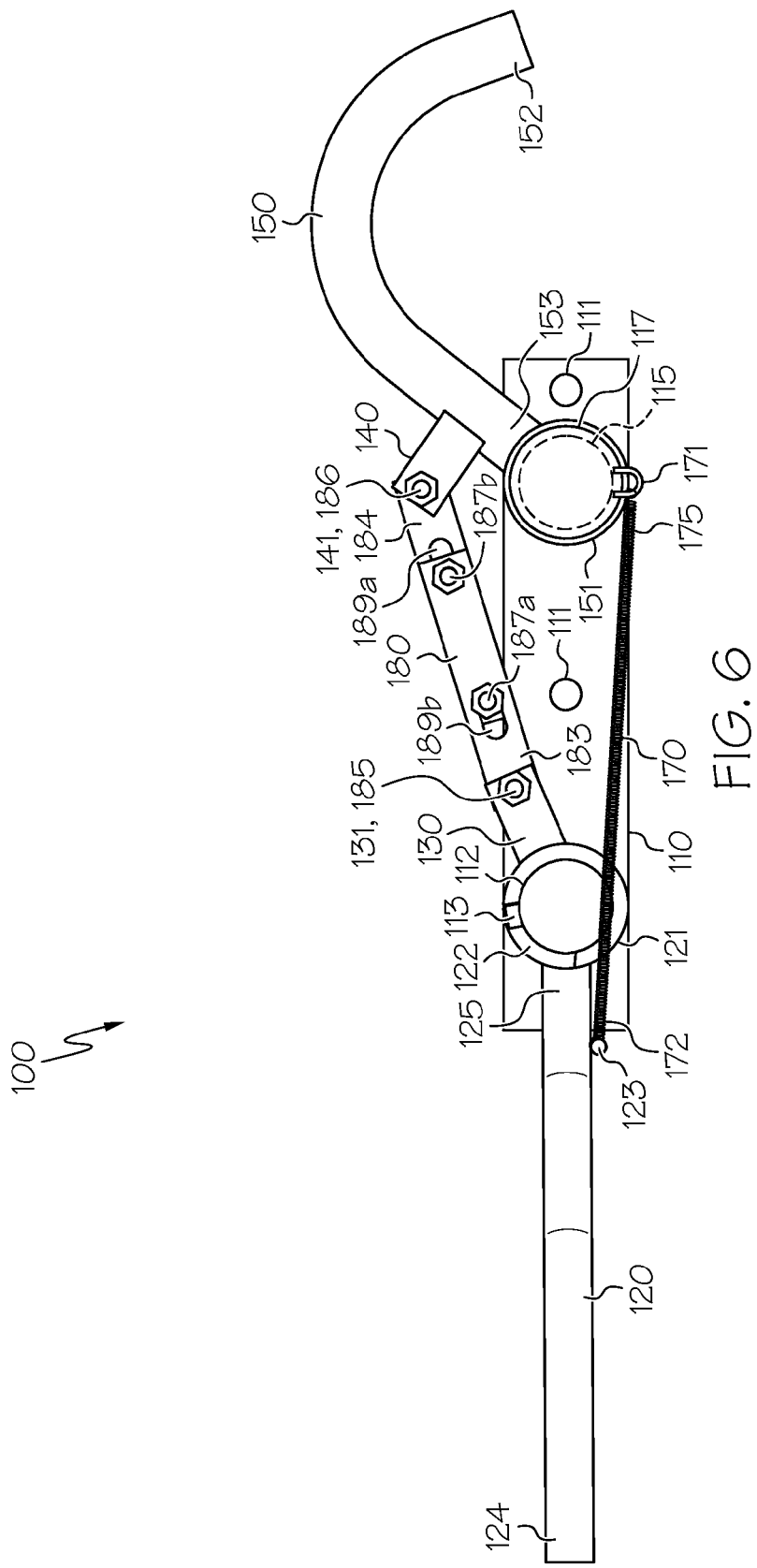
FIG. 6 is a side elevation view of the leg latch in the closed position.

There is a spring 170 attached to the handle 120 to provide torque for ease of unlocking and moving the handle 120. The spring 170 has a handle end 172 with an attachment hook, and a latch end 175 also with an attachment hook. Springs with attachment hooks at the end are well known in the art. There is a latch clip 171 which is attached to the latch post cap 117. In the preferred embodiment, the latch clip 171 is a small metal hook which is welded to the latch post cap 117. The attachment hook at the latch end 175 of the spring 170 is hooked to the latch clip 171. The attachment hook on the handle end 172 of the spring 170 is hooked onto the handle spring mount 123. In the preferred embodiment there is a circumferential groove near the tip end of the handle spring mount 123 which allows the spring hook to attach and remain in place on the handle spring mount 123. The length of the spring in the unstretched position is slightly shorter than the distance between the latch clip 171 and the handle spring mount 123 when the latch hook 150 is in the fully open position, as shown in FIG. 3 & FIG. 5. This will mean that tension is created when the latch hook 150 is closed (as shown in FIG. 4 & FIG. 6), which will provide force to make it easier to open the latch hook 150.

In use a cow or other cattle C is loaded into the chute 200 and the chute 200 is rotated into the layover position, thus placing the animal C on its side. The animal's leg's L protrude from the bottom of the chute 200. The leg L can be easily secured by holding the leg L in one hand and placing it below the latch hook 150 and with the other hand rotating the handle 120 away from the latch hook 150 to lock the latch hook 150 into place. The leg latches 100 are mounted to the sides of the chute 200 as described above, and configured so that the latch hook 150 loops around the animal's leg L and secures the leg L against the side of the chute 200, as shown in FIG. 2, with the latch hook 150 making a semi-circle, and the wall enclosing the semi-circle to fully constrain the leg L. The cattle's leg L is much thinner than the hoof H, so the latch hook 150 does not need to press or attach to the leg L in order the keep the hoof H secured within the latch hook 150. Each of the four legs L can be secured in the same manner. The animal's legs L are now secured and in a convenient position for medical inspection or trimming of the excess growth on the hooves.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A leg latch for restraining the leg of an animal in an animal control chute, said latch comprising:
   a base plate mounted to a bottom edge of the animal control chute, said base plate having a latch hook rotatably mounted on said base plate wherein said latch rotates to partially encircles the leg against the bottom edge of the animal control chute to restrain the leg in place and means for opening and closing said means for latching.

2. The leg latch of claim 1 wherein said means for opening and closing said means for latching comprises a handle rotatably mounted on said base plate and attached to said means for latching by an attachment linkage, wherein rotation of said handle rotates said means for latching to restrain the leg of the animal.

3. The leg latch of claim 1 wherein said means for opening and closing said latch comprises a handle rotatably mounted on said base plate and attached to said latch by an attachment linkage, wherein rotation of said handle rotates said latch to restrain the leg of the animal.

4. The leg latch of claim 3 wherein said attachment linkage consists of a handle mounting bracket fixedly attached to said handle, a latch mounting bracket fixedly attached to said latch, and an arm rotatably attached to said handle mounting bracket at a first end and rotatably mounted to said latch mounting bracket at a second end, wherein rotation of the handle moves said arm to move said latch.

5. The leg latch of claim 4 further comprising a locking means to lock said latch in place to restrain the leg of the animal, said locking means consisting of aligning said handle mounting bracket in a straight line with said arm.

6. The leg latch of claim 1 wherein there are four leg latches mounted on a bottom edge of the restraining chute to restrain all four legs of the animal.

7. A leg latch for restraining the leg of an animal comprising:
   an animal control chute having four walls, each of said four walls having a bottom;
   a base plate for mounting said leg latch to said bottom of said walls to restrain the legs of the animal as they extend from the chute;
   a latch hook mounted to said base plate and configured to encircle the leg of the animal;
   a handle mounted to said base plate and attached to said latch hook by a linkage and configured to open and close said latch hook;
   wherein an animal is retrained in said animal control chute such that its legs extend from the chute, and wherein each of the animal's legs are placed below a paired latch hook and said handle is manipulated to encircle said leg and secure said animal in said chute.

8. The leg latch of claim 7 wherein there are four leg latches to restrain each of the four legs of the animal.

9. The leg latch of claim 7 wherein said animal control chute has a front wall, a rear wall, an inside wall, and an outside wall, and wherein a first leg latch is attached to said front wall, a second leg latch is attached to said rear wall, a third leg latch is attached to said inside wall, and a fourth leg latch is attached to said inside wall.

\* \* \* \* \*